Patented Oct. 30, 1951

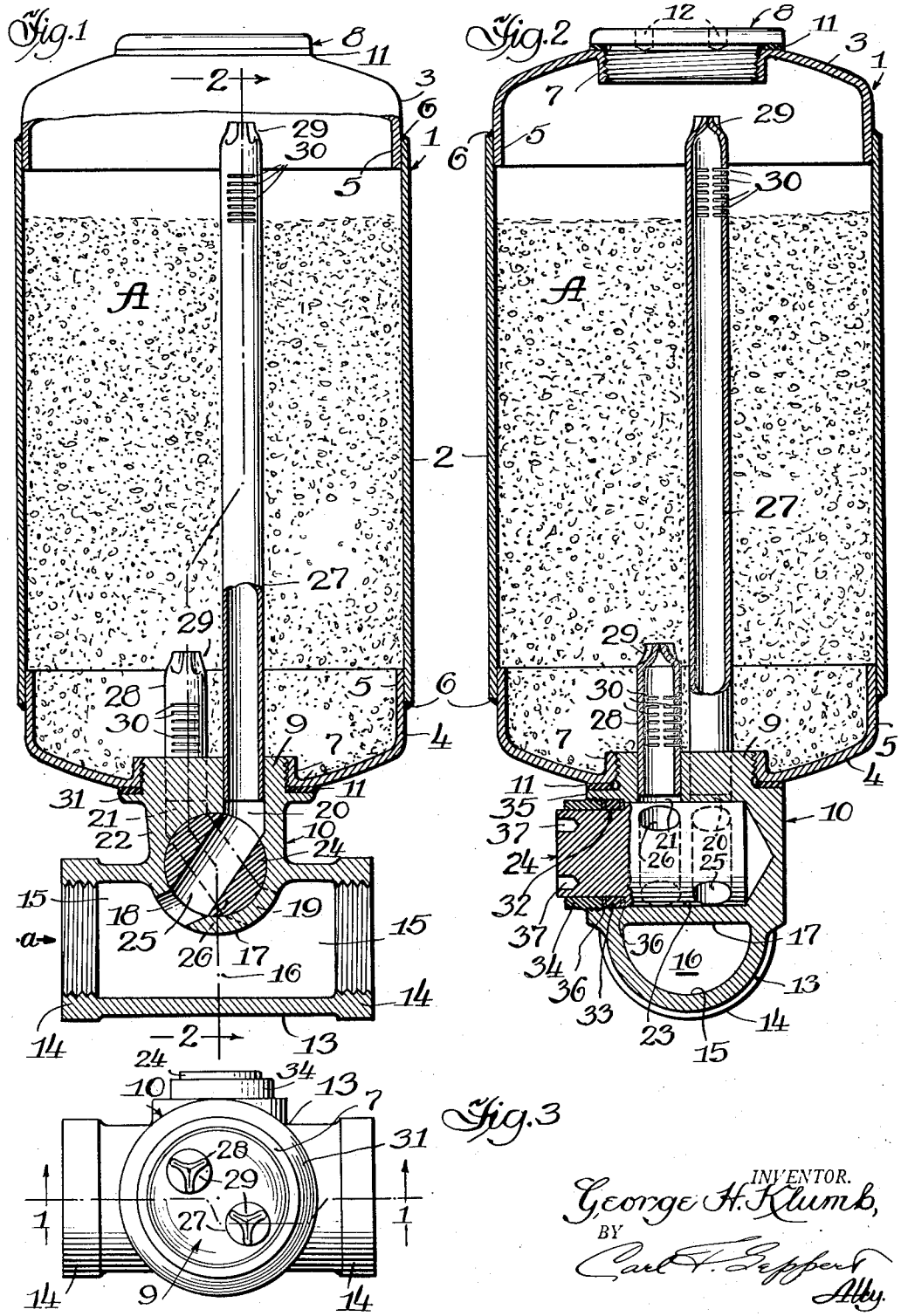

2,573,576

UNITED STATES PATENT OFFICE 2,573,576

CHEMICAL FEEDER

George H. Klumb, Northbrook, Ill., assignor to Culligan Zeolite Company, Northbrook, Ill., a corporation of Delaware Application September 14, 1948, Serial No. 49,162

3 Claims. (Cl. 210—36)

The present invention relates generally to a water-treating device and more particularly to a novel chemical feeder adapted to be inserted in a liquid carrying conduit for supplying a desired chemical to the liquid stream and provided with novel means for controlling the feed of the chemical to the stream.

In the present novel feeder the chemical to be added is fed to the main stream by diverting or by-passing a controllable quantity of the liquid from the main stream into and through the feeder tank where it comes in contact with the chemical to be fed into the liquid stream, and then returning this liquid so treated to the main stream. More specifically, the liquid flowing in the main line enters the valve assembly of the feeder where due to both a Venturi action and an impact pressure, a portion of the liquid is diverted or by-passed by being forced through the valve into the tank or body of the feeder.

Due to the differential in pressure thus formed, plus the Pitot tube arrangement of incoming and outgoing channels or ports to and from the feeder, there is provided a positive flow through the feeder. The quantity of liquid which is by-passed or diverted from the main stream may be readily controlled by adjusting the valve to increase or decrease the size of the channel or port through which the liquid is diverted.

It is therefore an object of the present invention to provide a novel construction of chemical feeder adapted to be mounted in a liquid stream for diverting a portion of the main stream into the feeder where it comes in contact with a chemical to be fed, the diverted liquid carrying the chemical being then returned to the main stream for chemically treating such stream with a controlled feed of the chemical.

The invention further comprehends a novel chemical feeder that can be operated in either direction so that the diverted or by-passed liquid from the main stream may pass through the feeder and contained chemical in either direction. In the novel embodiment, the feeder is provided with a long and a short manifold through which the diverted liquid may pass in either direction; i. e, in either an upward or downward direction through the body of the chemical to be fed.

Thus by being able to reverse the direction of flow by reversing the position of the feeder, chemicals or treating substances which have a tendency to pack in the feeder and restrict the flow therethrough may be fed for the reason that should such chemical became packed after the diverted liquid has been passed therethrough in a downward direction, the flow may be reversed so as to pass through the chemical in an upward direction. This upward flow may also be employed if the liquid to which the chemical is to be fed is turbid, for the reason that the turbidity, which forms a restricting layer on top of the bed of chemical in a downflow operation, will pass through the loosened chemical bed in an upflow operation.

For those chemicals which can only be fed through an upward flow, such as due to serious compaction and stoppage of flow, the feeder may be mounted in a permanent upflow position.

Another important feature is the novel means and manner of controlling the flow of liquid to the feeder independently of the total flow of the main stream. This is accomplished by the use of a single valve for varying the quantity of the flow diverted through a simple manipulation of this valve.

A still further object of the present invention is the provision of a novel valve construction and assembly in which a single valve, provided with a double orifice having an inlet and an outlet port, controls both the inlet to and the outlet from the feeder, the valve being so constructed and arranged as to accurately control the flow through the ports as well as close off or discontinue the flow through the feeder but without discontinuing the flow of the main stream when it is desired to recharge the feeder with the desired chemical.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is disclosed a preferred embodiment it is to be understood that the same is susceptible of modification and change and comprehends other features and constructions without departing from the spirit of the invention.

In the drawing:

Figure 1 is a view, part in vertical cross section and part in front elevation, the section through the novel feeder assembly being taken on the irregular line 1—1 of Fig. 3.

Fig. 2 is a view in vertical cross section taken on the irregular line 2—2 of Fig. 1.

Fig. 3 is a top plan view of the novel valve construction removed from the tank.

Referring more particularly to the embodiment shown in the drawing and selected to illustrate the novel invention, the chemical feeder 1 comprises a cylindrical body 2 preferably formed of a section of seamless metal tubing such as steel or the like, having an upper head 3 and a lower head 4 preferably of similar construction and each provided with a flange 5 conformably received or press-fitted into the opposite ends of the cylindrical body to form a feeder tank for receiving and enclosing a bed of chemical. These heads may be of suitable sheet metal and permanently or securely attached to the body by soldering or the like at 6.

Each head is reduced at one end and thereat provided with an inturned flange 7 providing a centrally disposed opening for access to the interior of the feeder and with each flange internally threaded, the flange 7 of the upper head being adapted to detachably receive a threaded cap or closure 8 for allowing access to the interior of the feeder tank for ease in removing, cleaning or replacing of the manifolds, or for recharging the bed of chemical therein, and the lower head being adapted to detachably receive the threaded shank 9 of a valve assembly 10. A gasket 11 of rubber or the like provides an effective seal between the cap or closure 8 and the upper head 3 when the latter is tightened by a suitable tool having pins or projections adapted to be received within spaced openings or recesses 12 in the cap.

The valve assembly 10 comprises a valve body 13 preferably formed as a casting provided with threaded projections 14, 14 for attachment to conduits or pipe sections (not shown) for the passage of a liquid under pressure. The main stream of the liquid, such as water, to be chemically treated, is fed through the passage 15 which is reduced or constricted at 16 by means of an arcuate wall 17 having a pair of spaced openings or ports 18 and 19 therethrough and aligned with spaced openings 20 and 21, respectively, provided in the neck or throat 22 of the valve body.

The neck or throat 22 is cored to provide a transverse bore 23 for the reception of a valve plug 24 having a pair of spaced and oppositely inclined channels or passages 25 and 26 extending laterally or transversely through the plug and adapted to be moved into alignment or registry with the ports or openings 18 and 19 in the arcuate wall 17 and the ports or openings 20 and 21 provided in the neck or throat 22 of the valve body. In the opening 20 is mounted a relatively long manifold 27 and in the opening 21 is mounted a relatively short manifold 28, each comprising a tubular member having its upper end 29 closed, but each provided adjacent this upper end with a plurality of relatively long but narrow slots 30 forming passages therethrough extending transverse of these tubular manifolds and disposed in spaced relation about and longitudinally thereof as shown more clearly in Figs. 1 and 2. These slots are of such size as to permit passage of the liquid but prevent or substantially restrict the transmission of solids therethrough.

To prevent leakage where the valve assembly is attached to the lower head 4 by the threaded shank 9, a gasket 11 similar to the gasket sealing between the cap or closure 8 and the upper head 3, is provided between a peripheral flange 31 on this shank and the underside of the head 4 so that when the threads between these parts are drawn tight, a liquid-tight seal is effected.

To seal between the body of the valve 10 and the plug 24 when these parts are assembled, and to retain these parts in such assembled relation, the plug is preferably reduced in diameter at 32 and encompassing this reduction is a packing or sealing washer 33 of rubber or the like disposed between the shoulder formed on the plug by the reduction and an externally threaded collar 34 detachably threaded into the encompassing flange 35 on the valve body. Preferably a washer 36 of brass or other suitable metal is disposed at each of the opposite ends of the packing or rubber washer.

Spaced openings or recesses 37 provided in the face of the plug 24 and adapted to receive a tool having similarly spaced pins or projections, permits the quick rotation of the plug to adjust its channels or passages 25 and 26 with respect to the openings or ports 18 and 19 and openings 20 and 21 in the valve body. In the position shown in Fig. 1, the respective ports and channels or passages are in fully open position whereby the liquid from the main line flows into the valve body in the direction of the arrow $a$. Due to both a Venturi action and an impact pressure, a portion of the entering liquid is diverted through the port 18, inclined channel 25 in the plug and the opening 20 in the neck or throat 22 of the valve body, into and upwardly through the long manifold 27 and into the feeder.

From this manifold the diverted liquid passes or is discharged through the slots 30 adjacent the upper end 29 thereof, and then flows downwardly through the bed of solid chemical particles in the feeder tank. The depth of chemical A in the bed will vary as it is fed to the liquid being treated and when the tank is charged or recharged the chemical particles may extend to or even above the manifold openings or slots for the reason that these openings or slots are of such size as to prevent the initial particles from passing therethrough. It is, of course, understood that as the particles wear away, some of the fines may find their way through these slots and be discharged into the stream.

The diverted flow after coming in contact with the chemical and being thereby treated, is discharged through the slots 30 in the short manifold 28 and passes outwardly through the opening 21 in the neck or throat 22 of the valve body, through the aligned and inclined channel or passage 26 in the plug and out through the aligned port 19 in the valve body and back into the main liquid stream. The differential in pressure thus formed plus the Pitot tube arrangement of the incoming and outgoing channels or passages to and from the feeder, provide for positive flow therethrough. By adjusting the valve to increase or decrease the size of the passages therethrough, the amount of liquid which is diverted through the feeder may be quickly and easily controlled.

It will thus be evident that the present invention comprehends a novel chemical feeder employing a single valve that enables an accurately controlled feed of a chemical to a flowing liquid stream by diverting a controllable portion of the main liquid stream through the feeder tank where it comes in contact with the chemical to be fed.

By this novel construction and assembly, the flow of the liquid to the feeder tank may be accurately controlled by a single valve independently of the total flow of the liquid in the main stream. Thus the single valve with its dual orifice equally controls the inlet and outlet to the feeder, as well as permits complete discontinuance of the flow through the feeder without discontinuing the flow of the main stream. This permits recharging of the feeder with chemical at any time it becomes necessary or desirable.

The present invention further comprehends the provision of a novel chemical feeder that is reversible by reversing the position of the feeder whereby the diverted liquid may pass in either an upflow or in a downflow direction through the chemical in the tank.

Having thus disclosed my invention, I claim:

1. A chemical feeder adapted to be mounted in the main stream of a liquid to be chemically treated, comprising a feeder tank adapted to receive a bed of chemical to be fed and including a cylindrical body having an upper and a lower head each provided with a threaded opening, a detachable cap providing a closure for the upper head permitting access to the interior of the tank and recharging the bed of chemical, and a valve assembly detachably mounted in the lower head and including a valve body having a continuous and direct passage therethrough for the uninterrupted flow of the main stream of the liquid, a wall depending into and providing a constriction in said passage, said wall having a port provided at the pressure side of said constriction for receiving and diverting a portion of the main stream into the feeder tank and in contact with the chemical therein and a second port provided at the other side of and beyond the constriction at a point of reduced pressure for the discharge and return of the diverted and chemically treated portion back to the main stream, a bore in the valve body transverse of the passage and above said depending wall and communicating with said ports, and a valve plug rotatably mounted in the bore and provided with a pair of channels extending transversely therethrough and adapted to be moved into registry with the ports in the constriction when liquid is to be diverted from the main stream to and through the chemical in the feeder tank and back to the main stream, said valve plug being rotatable to adjust and control the effective opening through the ports whereby to control the quantity of liquid to be diverted from the main stream.

2. A chemical feeder for controlling the feed of a chemical to a flowing liquid stream, comprising a feeder tank having an opening at its upper end for charging the tank with the desired chemical and an opening in its lower end, a removable closure for the upper opening, a valve assembly including a valve body detachably mounted in the lower opening and including a coupling for mounting the feeder in the stream and provided with an uninterrupted passage therethrough whereby all the liquid of the stream passes through the valve body, and means for diverting but a desired portion of the stream through the valve body, feeder tank and back to the stream including a wall depending into the passage to provide constriction in the valve body, said wall having a port provided at the opposite sides of the constriction with each port communicating with the feeder tank, a cylindrical bore provided in the valve body above said wall into which said ports open and a valve member conformably received in the bore and provided with a pair of diametrically disposed and oppositely inclined passages therethrough each adapted to be brought into registry with one of the ports to provide for the transmission of liquid from one port through a valve passage and into the feeder tank and back through the other valve passage and the other port whereby the diverted portion and the chemical with which it is charged are returned to the liquid stream.

3. A chemical feeder adapted to be operated with the liquid to be treated flowing through the chemical to be fed in either an upflow or a downflow direction, comprising a feeder tank containing a bed of the chemical to be fed, means for diverting a portion of the stream to the feeder tank and back to the stream and including a removable housing at the lower end of the feeder tank, a pair of upstanding manifolds carried by and removable with said housing and both projecting into the tank, one being of such length as to extend to adjacent the top of the tank and the other being of considerably less length but projecting into the bed of chemical, each of said manifolds being closed at its upper end but adjacent thereto being provided with a plurality of elongated and relatively narrow slots disposed in closely spaced relation permitting the passage of the liquid but preventing or restricting passage therethrough of solid particles, a continuously open passage through the housing for transmission of the liquid stream and provided with a depending arcuate wall forming a restriction in the passage, said passage having an inlet and an outlet port in the wall of the housing opening into the passage at the opposite sides of the restriction for diverting a portion of the liquid stream into the housing and tank and returning it to the passage and main liquid stream with the chemical to be fed, and a single dual orifice valve in the housing adapted to be moved into and out of registry with the ports for controlling the quantity of water to be diverted, said valve being located outside said passage whereby the latter remains open for flow therethrough at all times.

GEORGE H. KLUMB.

REFERENCES CITED

The following references are of record in the file of this patent:

UNITED STATES PATENTS

| Number | Name | Date |
|---|---|---|
| 412,910 | Blessing | Oct. 15, 1889 |
| 423,773 | Jewell | Mar. 18, 1890 |
| 452,172 | West | May 12, 1891 |
| 1,671,699 | Clark | May 29, 1928 |
| 1,940,720 | Madsen | Dec. 26, 1933 |
| 2,329,350 | Kaysen, Jr. | Sept. 14, 1943 |
| 2,330,328 | Bachman | Sept. 28, 1943 |
| 2,462,886 | Morrow | Mar. 1, 1949 |

FOREIGN PATENTS

| Number | Country | Date |
|---|---|---|
| 300,341 | Great Britain | Nov. 15, 1928 |
| 385,173 | France | Feb. 29, 1908 |
| 15,383 | Germany | Sept. 20, 1881 |
| 260,279 | Germany | May 23, 1913 |